(12) United States Patent
Kudari et al.

(10) Patent No.: US 7,229,076 B2
(45) Date of Patent: Jun. 12, 2007

(54) MECHANICAL SEAL

(75) Inventors: Mitsuru Kudari, Sanda (JP); Masanobu Ninomiya, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 11/460,798

(22) Filed: Jul. 28, 2006

(65) Prior Publication Data
US 2006/0261559 A1 Nov. 23, 2006

Related U.S. Application Data

(63) Continuation of application No. 10/788,129, filed on Feb. 26, 2004, now abandoned.

(30) Foreign Application Priority Data

Mar. 3, 2003 (JP) ............................. 2003/055870

(51) Int. Cl.
*F16J 15/34* (2006.01)
(52) U.S. Cl. .................... 277/361; 277/399; 277/408
(58) Field of Classification Search ................ 277/361, 277/399, 408
See application file for complete search history.

(56) References Cited

U.S. PATENT DOCUMENTS

| 3,759,532 | A | 9/1973 | Lindeboom |
| 3,811,687 | A | 5/1974 | Honold et al. |
| 3,941,395 | A | 3/1976 | Ball et al. |
| 4,434,986 | A | 3/1984 | Warner |
| 4,654,023 | A | 3/1987 | Foldhazy |
| 5,058,905 | A | 10/1991 | Nosowicz et al. |
| 6,135,458 | A | 10/2000 | Fuse |
| 6,299,173 | B1 | 10/2001 | Lai |
| 6,325,378 | B1 | 12/2001 | Okumachi et al. |
| 6,454,268 | B1 | 9/2002 | Muraki |
| 6,494,460 | B2 | 12/2002 | Uth |
| 6,505,836 | B1 | 1/2003 | Toshihiko |
| 6,508,472 | B2 | 1/2003 | Omiya et al. |
| 6,517,077 | B1 | 2/2003 | Enomura |
| 6,655,693 | B2 | 12/2003 | Hosanna et al. |
| 6,708,980 | B2 | 3/2004 | Takahashi |
| 6,871,857 | B2 | 3/2005 | Kim |
| 2001/0052673 | A1 | 12/2001 | Okumachi et al. |
| 2002/0158416 | A1 | 10/2002 | Hosanna et al. |

FOREIGN PATENT DOCUMENTS

| JP | 50-74204 | 6/1975 |
| JP | 2000-179703 | 6/2000 |
| JP | 2001-021045 | 1/2001 |
| JP | 2001-087638 | 4/2001 |

*Primary Examiner*—Katherine Mitchell
(74) *Attorney, Agent, or Firm*—Smith, Gambrell & Russell, LLP

(57) ABSTRACT

A balance ratio for a stationary seal ring is designed to allow a seal face to be opened when, with a rotary seal ring at standstill, steam of a predetermined pressure is supplied to an endo-fluid region while a sealing-fluid region is brought into an exhausting state. On the other hand, an O-ring constituting a secondary seal portion is retained by a groove formed in a flange portion of a seal case, thereby preventing a force on the O-ring from affecting the stationary seal ring even when the steam is supplied to the endo-fluid region.

3 Claims, 6 Drawing Sheets

MECHANICAL SEAL

REFERENCE TO RELATED APPLICATIONS

This application is a continuation of U.S. patent application Ser. No. 10/788,129, filed on Feb. 26, 2004 now abandoned, and based on Japanese patent application no. 55870/1003 which was filed in the Japanese Patent Office on Mar. 3, 2003, which disclosures are incorporated herein by reference.

FIELD OF THE INVENTION

The present invention relates to a mechanical seal for sealing a shaft and more particularly, to a mechanical seal for use in apparatuses requiring periodical sterilization.

DESCRIPTION OF THE PRIOR ART

Apparatuses used for producing food, drug or the like require periodical sterilization for hygienic reasons. In this case, a mechanical seal used for sealing a rotary shaft of the apparatus is also subjected to the sterilization. Since such a mechanical seal has a structure including a sealing portion, it is difficult to pass a sterilizing fluid therethrough. Hence, the mechanical seal is disassembled before subjected to the sterilization. On the other hand, there has also been proposed a mechanical seal adapted for a so-called Sterilization-In-Place which permits the sterilization to be carried out in a non-disassembled state (see, for example, Japanese Unexamined Patent Publication No. 2001-21045). Specifically, a support member for supporting a stationary seal ring is retreated by means of a cylinder piston for producing a gap between the stationary seal ring and a rotary seal ring, and hot steam is passed through the gap thereby sterilizing the interior of the mechanical seal. The device is provided with a shield, such as bellows, between the support member and a casing, the shield preventing the fluid from entering a cylinder side.

The conventional mechanical seal, as described above, involves a disassembly operation each time the sterilization is carried out. Hence, the sterilizing operation suffers quite a poor efficiency. In a case where the mechanical seal adopts the arrangement as disclosed in the above-mentioned Patent Publication, on the other hand, the cylinder and associated members thereof are necessary, so that the mechanical seal as a whole has a large and complicated construction.

OBJECT AND SUMMARY OF THE INVENTION

In view of the foregoing, it is an object of the present invention to provide a mechanical seal which permits the sterilization to be carried out in the non-disassembled state and features a simple and compact construction.

According to the present invention, a mechanical seal interposed between a housing of an apparatus having a rotary shaft and the rotary shaft, and operative to seal an endo-fluid region against an exo-fluid region, the mechanical seal comprises: a rotary seal ring mounted to the rotary shaft; a stationary seal ring in axially opposing relation with the rotary seal ring for cooperatively defining therebetween a seal face constituting a primary seal portion for establishing a fluid seal between the endo-fluid region and the exo-fluid region, the stationary seal ring having a balance ratio designed to permit the seal face to be opened by supplying steam of a predetermined pressure to the endo-fluid region and by bringing the exo-fluid region into an exhausting state when the rotary seal ring is at standstill; a seal case mounted to the housing for axially movably retaining the stationary seal ring, and including a groove extended circumferentially of a portion thereof in close proximity of and opposing relation with the stationary seal ring; an elastic member retained by the seal case and urging the stationary seal ring into movement toward the rotary seal ring; and a seal member mounted in the groove and interposed between the stationary seal ring and the seal case for constituting a secondary seal portion for establishing a fluid seal between the endo-fluid region and exo-fluid region.

In the mechanical seal of the above arrangement, the balance ratio is so designed as to permit the seal face to be opened by supplying the steam. At this time, the seal member is subjected to the pressure of the steam but is received by an axial end face of the groove. Accordingly, the seal member does not affect the balance ratio for the stationary seal ring. It is therefore ensured that the seal face is positively opened to allow the steam to pass through the mechanical seal for sterilization. Thus is provided the mechanical seal permitting the sterilization to be carried out in the non-disassembled state. In addition, the mechanical seal does not require the cylinder for opening the seal face and hence, the mechanical seal featuring the simple and compact construction can be provided.

The above mechanical seal may have an exhaust hole extended through the seal case and having one open end located near a place where droplets fall, the droplets being formed by condensation on a surface of the stationary seal ring exposed to the exo-fluid region. In this case, the droplets are discharged via the exhaust hole and hence, the interior of the mechanical seal may be quickly dried by ventilating dry air therethrough after the ventilation of the steam.

DESCRIPTION OF THE PREFERRED EMBODIMENTS

Figure 1:
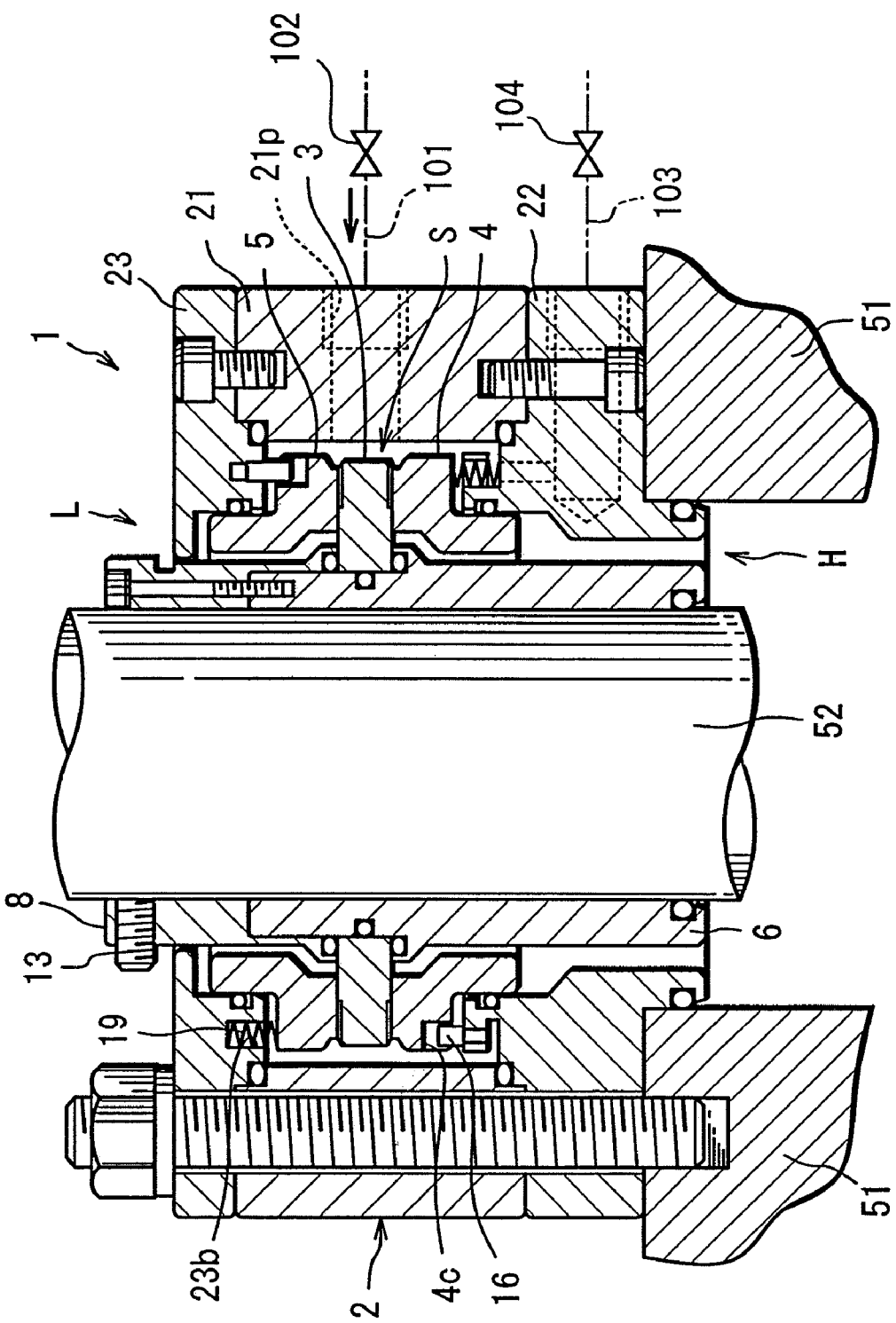
FIG. 1 is a sectional view showing a mechanical seal according to one embodiment of the present invention.

FIG. 1 is a sectional view showing a mechanical seal according to one embodiment of the present invention. The mechanical seal 1 is interposed between a housing 51 of an apparatus containing a sealed fluid therein and a rotary shaft 52 of the apparatus. The mechanical seal 1 includes in a seal case 2 two sets of rotary seal structures constituted by a rotary seal ring 3 in combination with a first stationary seal ring 4 and a second stationary seal ring 5. A first rotary seal structure is constituted by the rotary seal ring 3 and the first stationary seal ring 4. The first rotary seal structure provides a fluid seal between an endo-fluid region H within the housing 51 and a sealing-fluid region (exo-fluid region) S where a fluid such as a sealing gas is present. On the other hand, a second rotary seal structure is constituted by the rotary seal ring 3 and the second stationary seal ring 5. The second rotary seal structure provides a fluid seal between the sealing-fluid region S and an atmosphere region L opened into the atmosphere. The above apparatus is an agitator for food, drug or the like, for instance. The mechanical seal 1 is mounted substantially in a position shown in the figure.

Figure 2:
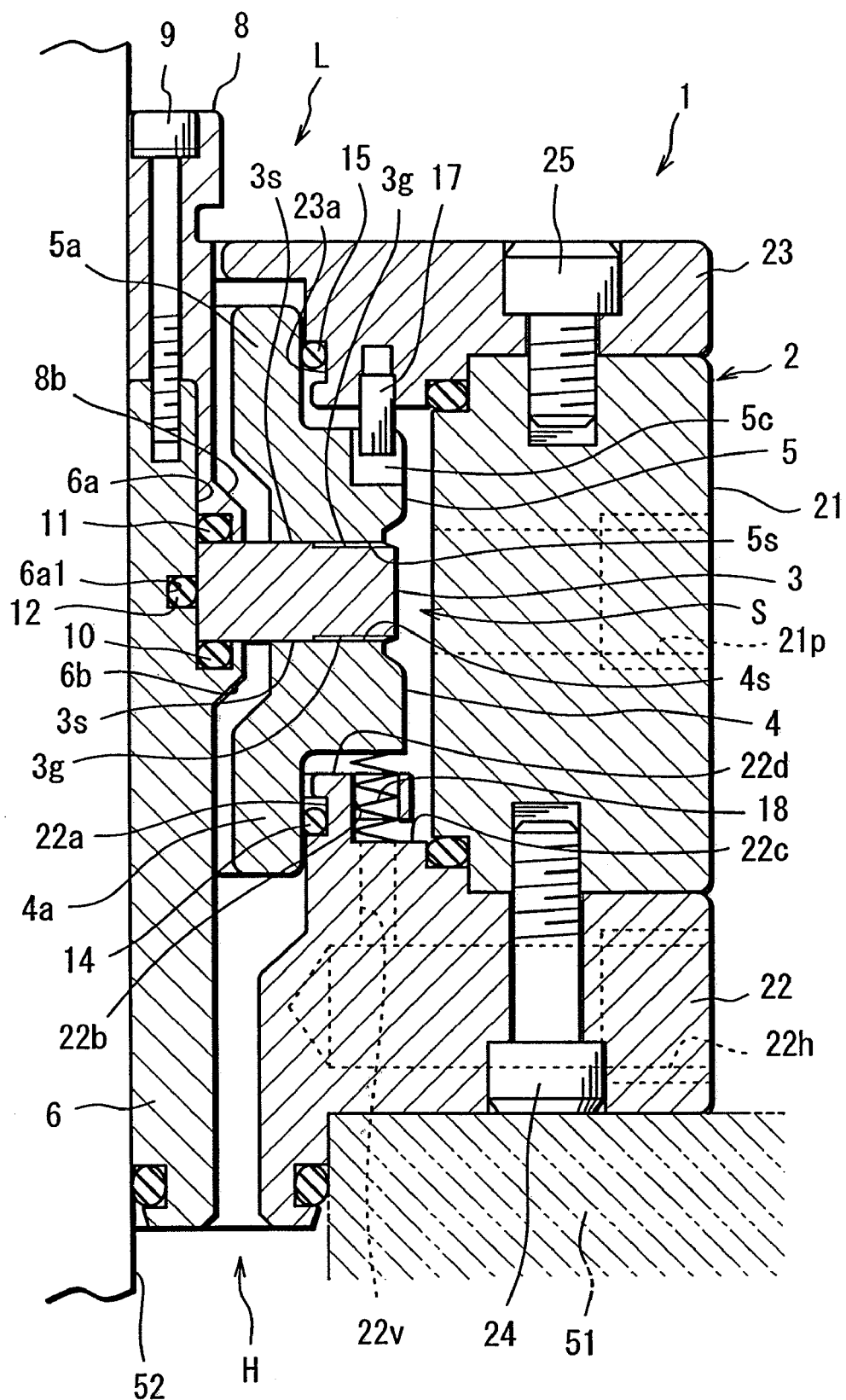
FIG. 2 is an enlarged view showing a right-half portion of FIG. 1.

FIG. 2 is an enlarged view showing a right half portion of FIG. 1. Referring to FIG. 2 (also to FIG. 1), the seal case 2 includes a cylindrical case body 21, and flange portions (retainers) 22, 23 fastened to axially opposite ends of the case body 21 via bolts 24, 25. On the other hand, a first sleeve 6 is fitted on the rotary shaft 52 of the agitator, and the annular rotary seal ring 3 is fitted on a cylindrical portion 6a formed at a distal end of the first sleeve 6. Upper and lower sealing end-faces 3s of the rotary seal ring 3 define flat faces orthogonal to an axis of the rotary shaft 52. It is noted that the sealing end-face 3s is formed with a plurality of shallow grooves 3g (depth of several micrometers) near an outer circumference thereof. The grooves 3g are radially extended and arranged in a radial fashion, for example.

A second sleeve 8, at the upper position, is fitted on the rotary shaft 52 after the rotary seal ring 3 is fitted on the cylindrical portion 6a. The second sleeve 8 is fitted with the first sleeve 6 at the lower position and fastened thereto by means of a bolt 9. The aforesaid rotary seal ring 3 is clamped between support portions 6b, 8b of the sleeves 6, 8 via O-rings 10, 11. The support portions 6b, 8b are protruded outwardly from respective outer peripheries of the sleeves 6, 8. An O-ring 12 is fitted in a groove 6a1 formed in the cylindrical portion 6a. The O-ring 12 is in contact with the rotary seal ring 3. The second sleeve 8 is fixed to the rotary shaft 52 by means of a plurality of screws 13 (only one of which is shown in FIG. 1).

On the other hand, the first stationary seal ring 4 and the second stationary seal ring 5, as annular members, have sealing end-faces 4s, 5s orthogonal to the axis of the rotary shaft 52, respectively. The first and second stationary seal rings 4, 5 oppose axially opposite sides of the rotary seal ring 3. Respective seal faces defined between the rotary seal ring 3 and the individual stationary seal rings 4, 5 constitute respective primary seal portions between the endo-fluid region H and the sealing-fluid region S, and between the sealing-fluid region S and the atmosphere region L.

The stationary seal rings 4, 5 have cylindrical base portions 4a, 5a extended in the opposite directions from the respective sealing end-faces 4s, 5s thereof. The cylindrical base portions 4a, 5a are axially movably inserted in the respective flange portions 22, 23. The flange portions 22, 23 are formed with U-shaped grooves 22a, 23a circumferentially of respective portions thereof which are in close proximity of and opposing relation with the respective base portions 4a, 5a. The grooves 22a, 23a receives therein O-rings 14, 15, respectively. Thus, secondary seal portions are defined between the endo-fluid region H and the sealing-fluid region S and between the sealing-fluid region S and the atmosphere region L.

The first and second stationary seal rings 4, 5 are formed with a plurality of notches 4c (FIG. 1), 5c (2 places in this embodiment) at outer peripheral corners thereof, and the notches are arranged with a predetermined circumferential spacing. In correspondence to the individual notches 4c, 5c, a plurality of pins (2 pins) 16 (FIG. 1), 17 are implanted in the flange portions 22, 23. These pins 16, 17 are engaged with the notches 4c, 5c in a manner to provide axial and radial clearances such as to permit some degrees of axial and radial movement of the stationary seal rings 4, 5. The flange portions 22, 23 are further formed with spring holding holes 22b, 23b (FIG. 1) at plural circumferential places thereof (6 places in the embodiment) where the pins 16, 17 are not implanted. The stationary seal rings 4, 5 are urged into movement toward the rotary seal ring 3 by means of the springs 18, 19 (FIG. 1) mounted in these holes 22b, 23b.

The case body 21 is provided with a passage hole 21p, with which an external pipe line 101 (FIG. 1) and a valve 102 (FIG. 1) are connected. The sealing gas is introduced into the sealing-fluid region S by opening the valve 102. The pressure of the sealing gas is controlled such as to provide a higher pressure in the sealing-fluid region S than those of the endo-fluid region H and the atmosphere region L. During the operation of the agitator, the sealing gas of a predetermined pressure is constantly supplied to the sealing-fluid region S.

A vertical hole 22v and a horizontal hole 22h communicated therewith are extended through the flange portion 22. The vertical hole 22v and horizontal hole 22h constitute a steam ventilation hole to be described hereinlater. An upper end of the vertical hole 22v opens into a spring seat face 22c facing the sealing-fluid region S. The horizontal hole 22h is connected with an external pipe line 103 (FIG. 1) and a valve 104 (FIG. 1). When the valve 104 is opened, the external pipe line 103 is opened into the atmosphere.

Figure 3:
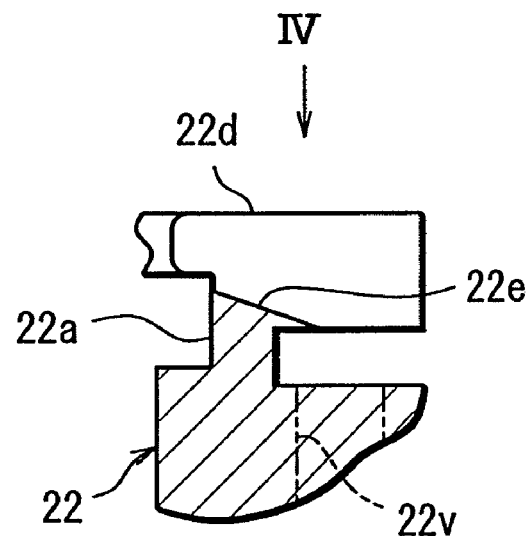
FIG. 3 is a fragmentary enlarged view showing a part of a flange portion of the above mechanical seal.
Figure 4:
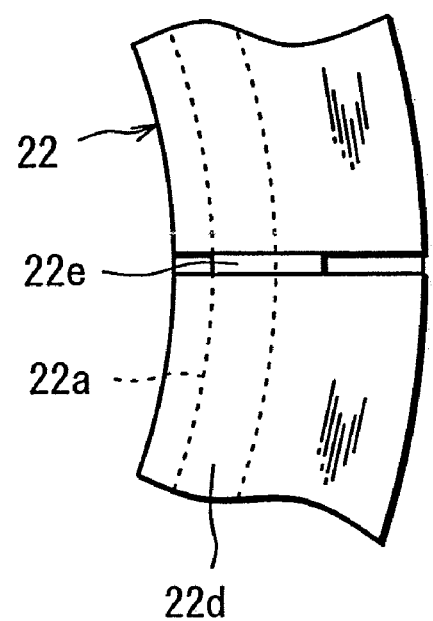
FIG. 4 is a view as viewed along the arrow IV of FIG. 3.

FIG. 3 is an enlarged sectional view showing an upper end of the flange portion 22 (the figure showing a portion of a different circumferential phase from that of the spring holding hole 22b). FIG. 4 is a view as viewed along an arrow IV in FIG. 3. Referring to the figures, the flange portion 22 is formed with a slit 22e cut down vertically from its top side 22d and radially extended to its outer periphery. The bottom of the slit 22e is inclined downwardly toward the outside (the right-hand side as seen in FIG. 3). The slit 22e is provided for discharging water accumulated in the groove 22a to the vertical hole 22v (specifically described hereinlater). The slits 22e are formed at plural circumferential places of the flange portion 22, and each of slits 22e is located at position of a different circumferential phase from that of the spring holding hole 22b.

Next, description will be made on how the mechanical seal of the above construction operates during normal operation. First, when the rotary shaft 52 is at standstill, both the first and second stationary seal rings 4, 5 are in contact with the rotary seal ring 3. When the rotary shaft 52 and the rotary seal ring 3 are rotated in a state where the sealing gas of the predetermined pressure is supplied to the sealing-fluid region S by opening the valve 102 and closing the valve 104, the sealing gas produces a dynamic pressure in the grooves 3g of the rotary seal ring 3. The dynamic pressure axially moves the stationary seal rings 4, 5 away from the rotary seal ring 3 (of the order of several micrometers), so that the rotary seal ring 3 and the stationary seal rings 4, 5 are maintained in non-contact relation via the sealing gas. Thus, fluid layers of the sealing gas are formed between the sealing end-face 3s of the rotary seal ring 3 and that 4s of the stationary seal ring 4, and between the sealing end-face 3s of the rotary seal ring 3 and that 5s of the stationary seal ring 5. Hence, fluid seal is provided between the endo-fluid region H and the sealing-fluid region S and between the sealing-fluid region S and the atmosphere region L. At this time, a minor amount of the sealing gas leaks into the endo-fluid region H and the atmosphere region L of relatively lower pressures. The amount of leaked gas constitutes a consumption of the sealing gas during the operation.

Figure 5:
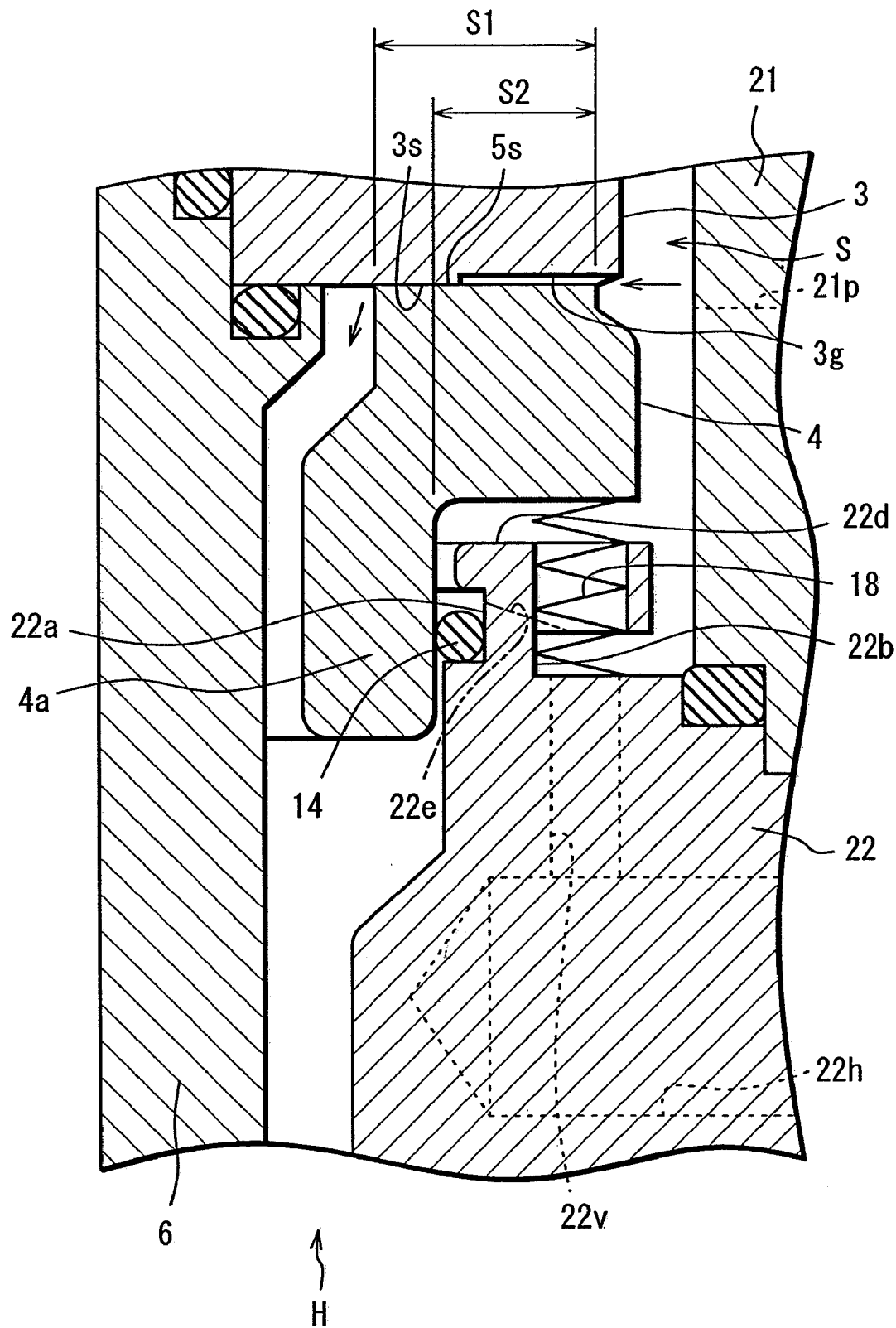
FIG. 5 is an enlarged view showing a portion around a rotary seal ring and a stationary seal ring during a normal operation of the above mechanical seal.

FIG. 5 is an enlarged view showing a portion around the rotary seal ring 3 and the first stationary seal ring 4 during the above normal operation. At this time, the O-ring 14 is located at a lower end of the groove 22*a* as subjected to the pressure of the sealing gas. A balance ratio K1 for the first stationary seal ring 4 is expressed as K1=S2/S1, where S1 denotes an area of seal face defined by the seal ring 4 (representing an annular area, and the following S2 and S3 also representing annular areas), and where S2 denotes a pressure receiving area subjected to a pressure for pressing the first stationary seal ring 4 in a direction to close the seal face. The value of the balance ratio is so designed as to cause the aforementioned separation of the first stationary seal ring 4 from the rotary seal ring 3, taking into consideration the spring force of the spring 18, the weight of the first stationary seal ring 4 and the like. Normally, the value of the balance ratio is preferably in the range of 0.6 to 1.6. The selection of such a value provides a seal arrangement which basically retains an intrinsic nature of the seal to inhibit the seal face from being opened and which permits the dynamic pressure to slightly open the seal face for bringing the stationary seal ring into the non-contact state.

It is noted that the second stationary seal ring 5 is also designed the same way.

Figure 6:
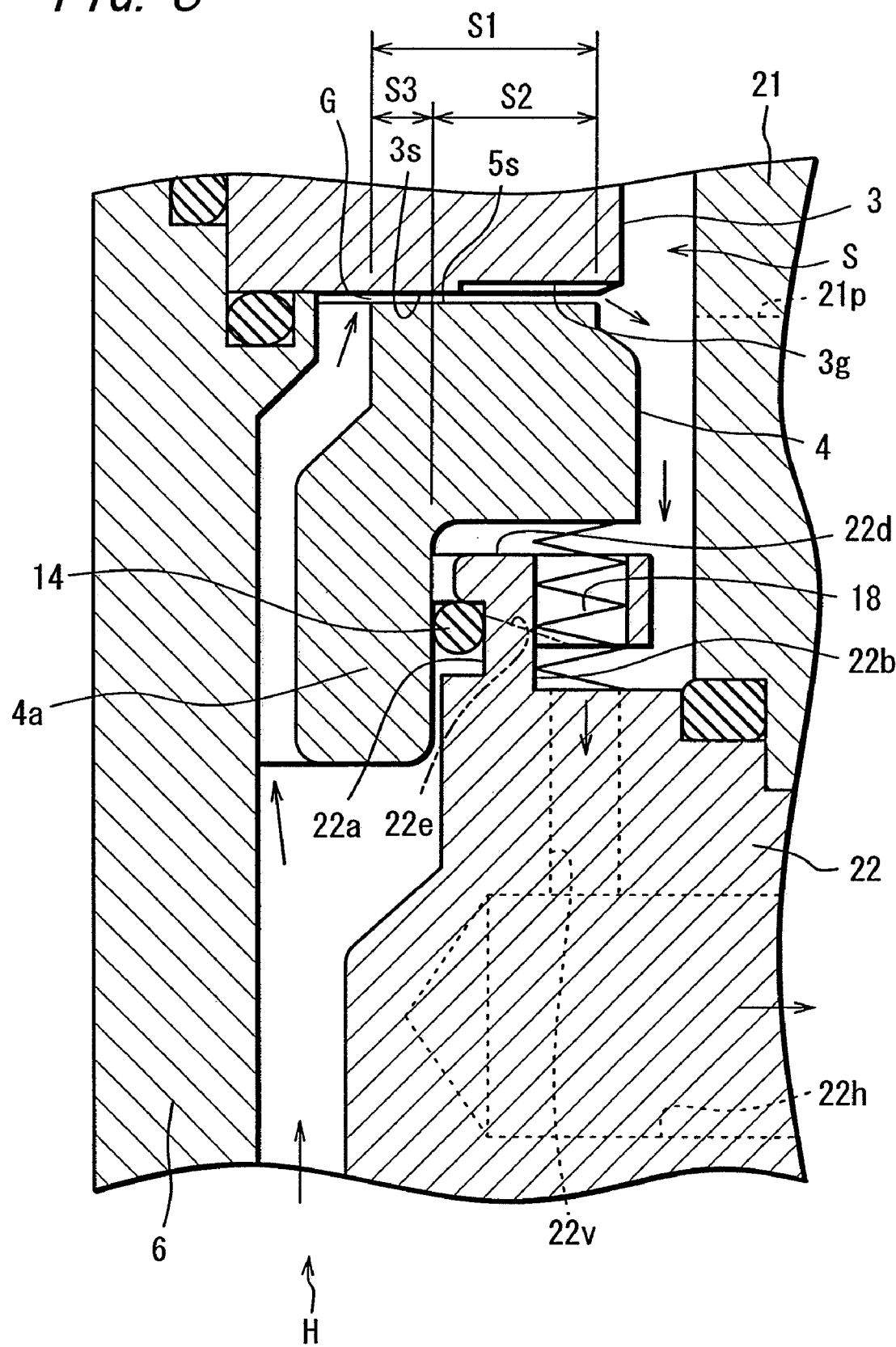
FIG. 6 is an enlarged view showing the portion around the rotary seal ring and the stationary seal ring of the above mechanical seal during a sterilizing operation.

Next, in a state where the agitator is deactivated to bring the rotary shaft 52 to standstill, the agitator is sterilized. In this sterilization operation, the valve 102 of FIG. 1 is closed, whereas the valve 104 is opened. This brings the sealing-fluid region S into an exhausting state. On the other hand, hot steam (at about 130° C.) of a predetermined pressure is supplied to the interior of the agitator or the endo-fluid region H. The steam sterilizes the interior of the agitator and also enters space between the rotary seal ring 3 and the first stationary seal ring 4. Thus, the first stationary seal ring 4 is moved away from the rotary seal ring 3, as shown in FIG. 6, so that a gap G (of dozens micrometers) is formed therebetween. The hot steam passes through the gap G and then through the vertical hole 22*v* and the horizontal hole 22*h* to be exhausted outside. In this manner, the sterilizing operation for the agitator also accomplishes the sterilization of the mechanical seal. In some cases, a pipe for discharging the steam may be added to the external pipe line 101 (FIG. 1) in order to promote the temperature rise of the mechanical seal portion during the sterilizing operation.

In the above sterilizing operation, the pressure of the steam moves the O-ring 14 in the groove 22*a* to make the O-ring 14 abut on an axially upper end of the groove, as shown in FIG. 6. At this time, the pressing force on the O-ring 14 is received by the flange portion 22 and hence, the pressing force does not act on the first stationary seal ring 4. Therefore, a balance ratio K2 for the first stationary seal ring 4 is expressed as K2=S3/S1, where S1 denotes the area of seal face defined by the seal ring, and where S3 (=S1−S2) denotes a pressure receiving area subjected to a pressure for pressing the first stationary seal ring 4 in the direction to close the seal face. The balance ratio K2 is rewritten as K2=1−K1. Conversely to the normal operation, the mechanical seal has a basic nature prone to open the seal face. Thus is provided a seal arrangement wherein the seal face is opened to a greater degree than in the normal operation by the supplied steam, thereby allowing for ventilation.

If, at this time, the force on the O-ring 14 is also applied to the first stationary seal ring 4, the force of closing the seal face is increased so that the balance ratio exceeds the above value K2. Accordingly, the first stationary seal ring 4 is less prone to move away from the rotary seal ring. However, the O-ring 14 is received by the flange portion 22, as described above, whereby the increase of the pressure receiving area S3 is avoided to thereby prevent the balance ratio from being affected. Consequently, it is ensured that the first stationary seal ring 4 is positively moved away to a degree required for the ventilation.

Because of the passage of the steam, condensation forms on the outside of the first stationary seal ring 4. However, the resultant droplets fall to be discharged via the vertical hole 22*v* and the horizontal hole 22*h*. In addition, droplets built up on the O-ring 14 are also discharged via the slits 22*e*. Subsequently, dry air in place of the steam is ventilated for quick removal of moisture adhered to the mechanical seal.

Figure 7:
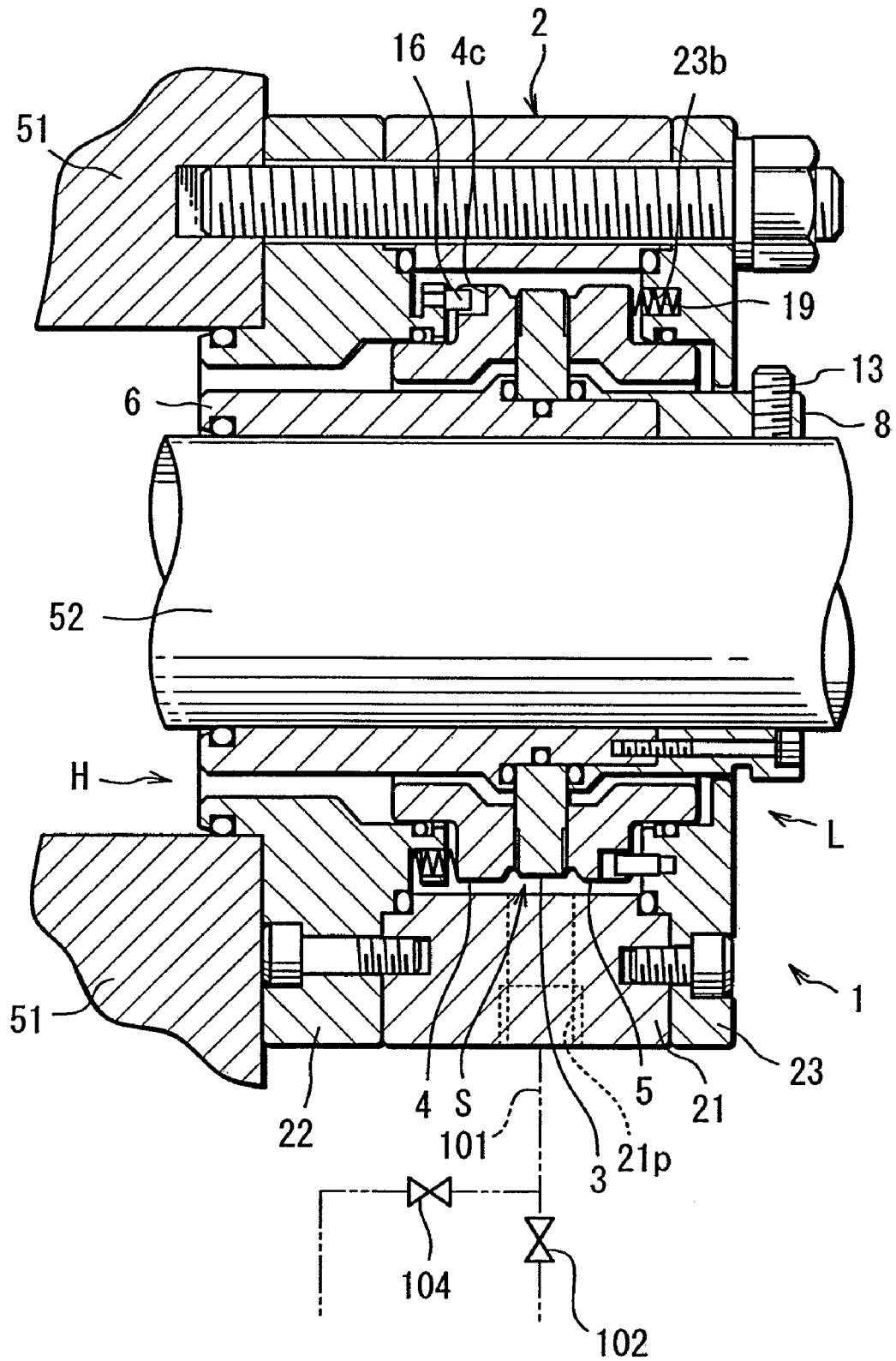
FIG. 7 is a sectional view showing a mechanical seal of a structure having a different exhaust system from that of FIG. 1.

The foregoing embodiment is arranged such that the steam is exhausted via the vertical hole 22*v* and the horizontal hole 22*h*. However, in a case where the mechanical seal is mounted in an apparatus with the rotary shaft 52 positioned horizontally, as shown in FIG. 7, the flange portion 22 may obviate the hole for discharging gas/water while the valve 104 may be connected with the external pipe line 101. In this case, the normal operation may be carried out with the valve 102 opened and the valve 104 closed. When the steam or dry air is ventilated, the valve 102 may be closed while the valve 104 may be opened.

While the foregoing embodiment illustrates the non-contact type mechanical seal, the sterilization may also be performed by the same arrangement using a contact type mechanical seal.

The O-rings 14, 15 may be replaced by other sealing members.

The spring 18 is not limited to the helical spring used in the foregoing embodiment but may be other elastic member. For instance, a leaf spring or metal bellows may be used. In a specific case, there may be used an O-ring.

We claim:

1. A method for operating a mechanical seal interposed between a housing for an apparatus having a rotary shaft and the rotary shaft, and operative to seal an endo-fluid region against a sealing-fluid region and an atmospheric region, the mechanical seal including:

a rotary seal ring mounted to the rotary shaft;

a first stationary seal ring in axially opposing relation with the rotary seal ring for cooperatively defining therebetween a seal face constituting a primary seal portion for establishing a seal between said endo-fluid region and the sealing fluid region;

a secondary stationary seal ring in axially opposing relation with the rotary seal ring for cooperatively defining therebetween a seal face constituting a primary seal portion for establishing a seal between the sealing-fluid region and the atmosphere region;

a seal case mounted to the housing for axially movably retaining the first stationary seal ring, and including a groove extending circumferentially of a portion thereof in close proximity to and in opposing relation with the first stationary seal ring;

an elastic member retained by the seal case and urging the first stationary seal ring into movement toward the rotary seal ring; and, a seal member mounted in the groove and interposed between the first stationary seal ring and the seal case for constituting a secondary seal portion for establishing a seal between the endo-fluid region and the sealing-fluid region, the method comprising the steps of:

having the first stationary seal ring designed to have a predetermined balance ratio K1 defined by K1=S2/S1 wherein S1 is an area of the seal face and S2 is a pressure receiving area subjected to a pressure of sealing fluid for pressing the first stationary seal ring in a direction to close the seal face to thereby obtain an intrinsic nature for inhibiting the seal face from being opened;

having the first stationary seal ring designed to have a predetermined balance ratio K2 defined by K2=S3/S1=(S1−S2)/S1 wherein S3 is a pressure receiving area subjected to a pressure in the endo-fluid region for pressing the first stationary seal ring in the direction to close the seal face;

supplying the sealing-fluid region with a pressure of sealing fluid higher than a pressure of the endo-fluid region during a normal operation of the mechanical seal to thereby permit the seal face to be slightly opened when a dynamic pressure is generated by rotation of the rotary seal ring; and supplying the endo-fluid region with steam of a predetermined pressure and bringing the sealing-fluid region into an exhausting state to thereby permit the seal face to be opened when the rotary seal ring is at standstill for a sterilization operation of the mechanical seal.

2. The method according to claim 1, wherein said apparatus is periodically sterilized.

3. A method for operating a mechanical seal interposed between a housing for an apparatus having a rotary shaft and the rotary shaft, and operative to seal an endo-fluid region against a sealing-fluid region and an atmosphere region, the mechanical seal including;

a rotary seal ring mounted to the rotary shaft;

a first stationary seal ring in axially opposing relation with the rotary seal ring for cooperatively defining therebetween a seal face constituting a primary seal portion for establishing a seal between the endo-fluid region and the sealing-fluid region;

a second stationary seal ring in axially opposing relation with the rotary seal ring for cooperatively defining therebetween a seal face constituting a primary seal portion for establishing a seal between the sealing-fluid region and the atmosphere region;

a seal case mounted to the housing for axially movably retaining the first stationary seal ring, and including a groove extending circumferentially of a portion thereof in close proximity to and in opposing relation with the first stationary seal ring;

an elastic member retained by the seal case and urging the first stationary seal ring into movement toward the rotary seal ring;

and a seal member mounted in the groove and interposed between the first stationary seal ring and the seal case for constituting a secondary seal portion for establishing a seal between the endo-fluid region and the sealing-fluid region, the method comprising the steps of:

providing said first stationary seal ring designed to have a predetermined balance ratio K1 defined by K1=S2/S1 wherein S1 is an area of the seal face and S2 is a pressure receiving area subjected to a pressure of sealing fluid for pressing the first stationary seal ring in a direction to close the seal face to thereby obtain an intrinsic nature for inhibiting the seal face from being opened;

providing said first stationary seal ring designed to have a predetermined balance ratio K2 defined by K2=S3/S1=(S1−S2)/S1 wherein S3 is a pressure receiving area subjected to a pressure in the endo-fluid region for pressing the first stationary seal ring in the direction to close the seal face;

rotating said rotary shaft and said rotary seal ring to produce a dynamic pressure, supplying the sealing-fluid region with a pressure of sealing fluid higher than a pressure of the endo-fluid region during a normal operation of the mechanical seal permitting the dynamic pressure to move the stationary seal ring away from the rotary seal ring to thereby permit the seal face to be slightly opened by the dynamic pressure generated by rotation of the rotary seal ring; and supplying the endo-fluid region with steam of a predetermined pressure and bringing the sealing-fluid region into an exhausting state to thereby permit the seal face to be opened when the rotary seal ring is at standstill for a sterilization operation of the mechanical seal.

* * * * *